No. 665,570. Patented Jan. 8, 1901.
M. F. MEISCH.
BICYCLE TIRE.
(Application filed Apr. 20, 1899.)
(No Model.)
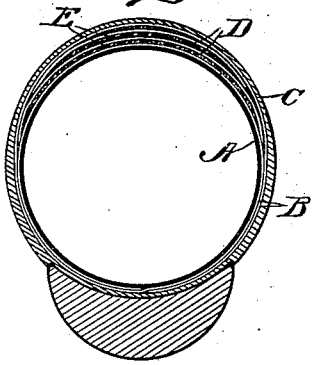
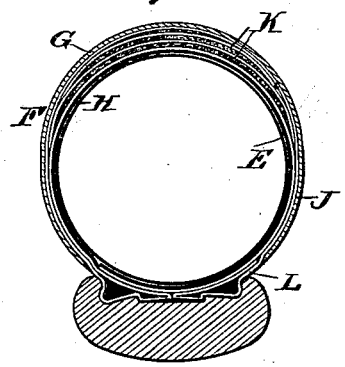
Witnesses.
Walter B. Payne
G. Willard Rich.
Inventor.
Michael F. Meisch
by Church & Church
his Attorneys

UNITED STATES PATENT OFFICE.

MICHAEL F. MEISCH, OF ROCHESTER, NEW YORK.

BICYCLE-TIRE.

SPECIFICATION forming part of Letters Patent No. 665,570, dated January 8, 1901.

Application filed April 20, 1899. Serial No. 713,781. (No model.)

*To all whom it may concern:*

Be it known that I, MICHAEL F. MEISCH, of Rochester, in the county of Monroe and State of New York, have invented certain new and useful Improvements in Bicycle-Tires; and I do hereby declare the following to be a full, clear, and exact description of the same, reference being had to the accompanying drawings, forming a part of this specification, and to the reference-letters marked thereon.

My present invention relates to tires for bicycles and similar vehicles, and has for its object to provide a pneumatic tire which is practically non-puncturable; and the invention consists in interposing between the exterior of the tire and the chamber containing the air a plurality of layers or strips of textile material, such as canvas, between which strips are located one or more layers of granular or pulverulent material of sufficient hardness to resist the introduction of tacks, nails, glass, or similar articles usually encountered in ordinary road-riding.

In the accompanying drawings I have shown two forms of tires constructed in accordance with my invention.

Figure 1 illustrates a sectional view of what is known as a "single-tube" tire, and Fig. 2 a similar view of a double-tube tire.

In forming single-tube tires according to my invention I provide an inner lining A, preferably of soft elastic rubber, and outside of this one or more layers of canvas B B and an outer covering C, preferably of soft rubber. The tread portion of the tire is strengthened or rendered non-puncturable by one or more layers of canvas, drilling, or other strong fabric D D, between or over which are located layers E of granular material of sufficient hardness to resist the inthrust of a pin or a tack. This granular material is of course secured so that it is incapable of shifting, and I prefer to apply it by incorporating it with rubber cement or liquid rubber or similar material, which is applied to the canvas or other material D. Then the strips are placed in position either inside or outside of the canvas tubes B during the making up of the tire, and the whole is then vulcanized in the ordinary manner.

By the employment of granular material, preferably applied in a plurality of layers, the particles are so distributed that it is practically impossible to thrust a pin or tack or other sharp instrument through the tire and to the interior thereof without encountering a sufficient quantity to prevent the entrance to the air-chamber of such pin or tack.

While any suitable pulverulent material of sufficient hardness to withstand the inthrust of tacks, &c., may be employed, I have used with success ground steel and ground vegetable ivory, but prefer the latter on account of its relative lightness and generally prefer to employ vegetable matter as distinguished from mineral for the same reason.

In Fig. 2 of the drawings I have shown the invention applied to a double-tube tire of the form known as the "clencher" type, E indicating the inner air-tube, preferably of thin rubber, and F the outer envelop, composed of the inner and outer layers G and H, respectively, of soft rubber, and the intermediate layers J of canvas. The tread portion of said tire envelop or cover is strengthened by the strips K of canvas, drilling, or other material, coated on one or both sides of the covering with granulated vegetable ivory or other material, preferably applied with a rubber-cement solution, the whole being vulcanized, as before described. This outer covering may be provided with the strips or flanges L for engaging with the corresponding grooves formed in the rim of a bicycle-wheel, or, if desired, said covering may be otherwise secured to the rim by mechanical fastening devices or cement, as usual.

I claim as my invention—

A pneumatic vehicle-tire having its tread portion composed of an outer covering of soft rubber, an inner protector or shield composed of a layer of fabric provided with a coating of vulcanized rubber embodying granulated vegetable ivory incorporated therewith, and an inner soft-rubber air-tube, substantially as described.

MICHAEL F. MEISCH.

Witnesses:
F. F. CHURCH,
G. WILLARD RICH.